(12) United States Patent
Wang

(10) Patent No.: US 7,854,348 B2
(45) Date of Patent: Dec. 21, 2010

(54) DEVICE FOR DISPENSING A VISCID MATERIAL

(75) Inventor: Feng-Ho Wang, Hsinchu Hsien (TW)

(73) Assignee: Jelley Pechnology Co., Ltd., Hsinchu (TW)

( * ) Notice: Subject to any disclaimer, the term of this patent is extended or adjusted under 35 U.S.C. 154(b) by 615 days.

(21) Appl. No.: 11/855,156

(22) Filed: Sep. 14, 2007

(65) Prior Publication Data

US 2009/0071986 A1  Mar. 19, 2009

(51) Int. Cl.
  *B67D 1/00* (2006.01)
(52) U.S. Cl. ............... 222/63; 222/326; 222/333; 222/386; 222/390; 222/571; 74/424.71
(58) Field of Classification Search ............ 222/63, 222/333, 390–391, 325–327, 571, 386; 74/424.71, 74/424.78

See application file for complete search history.

(56) References Cited

U.S. PATENT DOCUMENTS

| | | | | |
|---|---|---|---|---|
| 3,208,638 A | * | 9/1965 | Frenzel et al. | 222/39 |
| 3,854,629 A | * | 12/1974 | Blieberger | 222/109 |
| 4,180,187 A | * | 12/1979 | Ben-Haim | 222/326 |
| 4,306,671 A | * | 12/1981 | Fisher | 222/326 |
| 4,322,022 A | * | 3/1982 | Bergman | 222/327 |
| 4,335,834 A | * | 6/1982 | Zepkin | 222/63 |
| 5,341,958 A | * | 8/1994 | Bayat et al. | 222/63 |
| 5,871,299 A | * | 2/1999 | Lai | 403/322.1 |
| 6,488,180 B1 | * | 12/2002 | Bayat | 222/137 |
| 7,637,392 B2 | * | 12/2009 | Hsu et al. | 222/137 |

* cited by examiner

*Primary Examiner*—Frederick C. Nicolas

(57) ABSTRACT

A device for dispensing a viscid material includes a supporting body constructed by a carriage. A ball screw is installed within the supporting body. A rod piston is mounted on one end of the ball screw. A transmission module is mounted on a nut of the ball screw. The transmission module is engaged with an actuator controlled by a control circuit device. The control circuit device, which includes a switch and a circuit board, etc, controls the positive and negative rotations and the stop operation of the actuator. A trigger is set up on one side of the supporting body. When the trigger is pressed, the actuator is driven to rotate in the positive direction to drive the ball screw to move forwardly in a stable way. While the trigger is released, a sensor is activated to drive the actuator to rotate in the negative direction.

15 Claims, 13 Drawing Sheets

DEVICE FOR DISPENSING A VISCID MATERIAL

FIELD OF THE INVENTION

The present invention relates to a device for dispensing viscid materials, and especially to a device for dispensing viscid materials, by utilizing the low friction factor of a ball screw together with the rotation of an actuator to cause a stable forward moving to force a silicon cartridge forward and a later quick backward moving of the ball screw by pressing the trigger, so as to achieve a stable flux of the viscid material; prevent the leakage of the silica gel during the working process; achieve an effort-saving construction; and in turn reduce the cost. The above-mentioned viscid materials include seal-up glue, grease, etc. Grease is needed in the plumber blocks, gear boxes, crankshaft boxes, and transport chains, etc of the machines and tools utilized in the auto industry, the construction industry, the foodstuff industry, the national defense industry, the transport industry, and the heavy industry, etc. Seal-up glue is used as adhesives in houses, factories, construction sites, or other field to provide seal-up effects. It can be applied in the seal-up of the vehicle windscreens, configurations of the lamps, and seal-up of the body seams of the refrigerator cars, vans, and buses. It can also be applied on the aluminum-alloy doors and windows, curtain walls of buildings, seal-up of hollow glasses, underwater buildings, and underground constructions. It can further be used on the container wood floorings, seal-up of side boards, seal-up of fuel tanks, marine doors and windows, marine warehouse seal-up, submarine seal-up. Even more, the applications also include repairing of leaking roofs, tubs, bathtubs, fish jars, etc. The field of the applications covers a remarkably wide range of fields.

BACKGROUND OF THE INVENTION

A conventional pneumatic caulking gun, such as the one disclosed in a Taiwan Patent Application with a Publication No. 563598, is as shown in FIG. 1, which includes a body 1 having a handle 11 to be hold by the users. The top of the handle 11 includes a placing base 12. Furthermore, a stopper 13 is mounted at the front end of the placing base 12 for placing thereon a silicon cartridge 4. A channel 14 is disposed between the handle 11 and the placing base 12 for being penetrated therethrough a control rod 5. An air inlet channel 111 and an air exhaust channel 112 are installed within the handle 11 for allowing the entry of the compressed air and the exhaust of the wasted air. Furthermore, both the air inlet channel 111 and the air exhaust channel 112 include inner threads 113 formed simultaneously. When being used, the silicon cartridge 4 is placed on the placing base 12, and the front portion of the silicon cartridge 4 is stopped by the stopper 13 while the end portion of the silicon cartridge 4 is disposed against a valve sheet 3 mounted within a valve seat 15. Then, the control rod 5 is driven backwardly by controlling the shift of the control rod 5. An air inlet 23 disposed on a rod seat 22 is then opened so that the compressed air enters an air chamber 21 of a valve cover 2 through the channel 14 and the air inlet channel 23, and then ejects from an air outlet 31 of the valve sheet 3 so as to push against a base block 41 in the end portion of the silicon cartridge 4. Accordingly, the silica gel is squeezed out from the silicon cartridge 4 and applied to working pieces. However, the users may feel tired since the air must be compressed by holding the handle 11 with hands. Furthermore, there might be dangerous situations caused by the user's uneven forces that render the user's losing his balance when the operation is on scaffolds. Moreover, when the silica gel is squeezed out from the silicon cartridge 4 by the compressed air, the exceed air pressure will keep on pushing the silicon cartridge 4 to cause a deformation of the silicon cartridge 4, and unnecessary silica gel will be squeezed out. Consequently, gel drops of the caulking are gun generated and thus the material is wasted.

Furthermore, an electric caulking gun is disclosed respectively in the patent specifications of U.S. Pat. No. 6,123,235 and TW00405447. In such a caulking gun, a conventional DC motor is used and a set of clutch is additionally mounted on the transmission system thereof. Accordingly, when the trigger is stopped pressing, the clutch is also activated to separate the DC motor from the pushing rod, and thus the resistance to the backward movement of the push rod is removed so that the counterforce generated by the viscid material is capable of pushing the push carriage back to retard the leakage phenomenon. However, the addition of the set of clutch mechanism can only "retard", but not "stop" the leakage. Furthermore, the push rod of such a caulking gun is a rack. The engagement of a rack and a gear relates to a slide friction. The friction lost of the gear-rack engagement is far higher than that of a ball screw. Being a transpose mechanism, the gear-rack engagement is also weaker than the ball screw in structure strength. Therefore, when bearing the same load, a ball screw needs less material, and thus is smaller and lighter. Since the conventional device includes the above-mentioned defects, it is desired to provide an improved device for dispensing the viscid material without these defects.

SUMMARY OF THE INVENTION

A primary object of the present invention is to provide a device for dispensing viscid materials. By utilizing the low friction resistance of the ball screw together with the rotation of the actuator, a stable forward moving of the ball screw to push the silicon cartridge and a quick drawing back can be achieved by only pressing a trigger. Accordingly, the flux of the viscid material is stable, the gel-drop is prevented, the operation is effort-saving, and the cost is reduced.

To achieve above object, the present invention provides a device for dispensing viscid material according to the present invention which includes a supporting body constructed by a carriage. A ball screw is installed within the supporting body. A rod piston is mounted on one end of the ball screw. A transmission module is mounted on a nut of the ball screw. The transmission module is engaged with an actuator controlled by a control circuit device. The control circuit device, which includes a switch and a circuit board, etc, controls the positive and negative rotations and stop of the actuator. A plane or a fillister is formed on a shank of the ball screw. A corresponding plane or protruding object is disposed on the body for limiting the shank to be rotated with the transmission module. A trigger is set up on one side of the body. The trigger connects to a trigger sensor of the control circuit device for controlling the operation of the actuator. When the trigger is pressed, the actuator is driven to rotate in the positive direction to drive the ball screw moving forward stably. When the trigger is released, the actuator rotates in a negative direction to drive the ball screw drawing back stably by means of the trigger sensor or electric current checking circuit in the control circuit device. Furthermore, a normal battery is optionally installed within the supporting body to be a power source. Accordingly, this disclosed subject matter is convenient to be operated in a high place and therefore a user thereof can be protected form the danger of tripping over a power cord.

The present invention further includes a trigger sensor, which senses the position of the trigger for controlling the negative rotation of the actuator to prevent the gel-drops. The trigger sensor might be a one-way switch. When the trigger 301 is pressed, the actuator rotates in the positive direction, and the ball screw moves forwardly. On the other hand, when the trigger is released to a certain position, the one-way switch is switched on, and thus the actuator rotates in the negative direction.

The present invention further includes an optical sensor. The switch the trigger has a corresponding indicia. The optical sensor serves to detector whether the trigger moves forwards or backwards.

BRIEF DESCRIPTION OF THE DRAWINGS

FIG. 3-1 is a cross-sectional view schematically illustrating a ball screw of the preferred embodiment according to the present invention;

DESCRIPTIONS OF PREFERRED EMBODIMENTS

Figure 1:
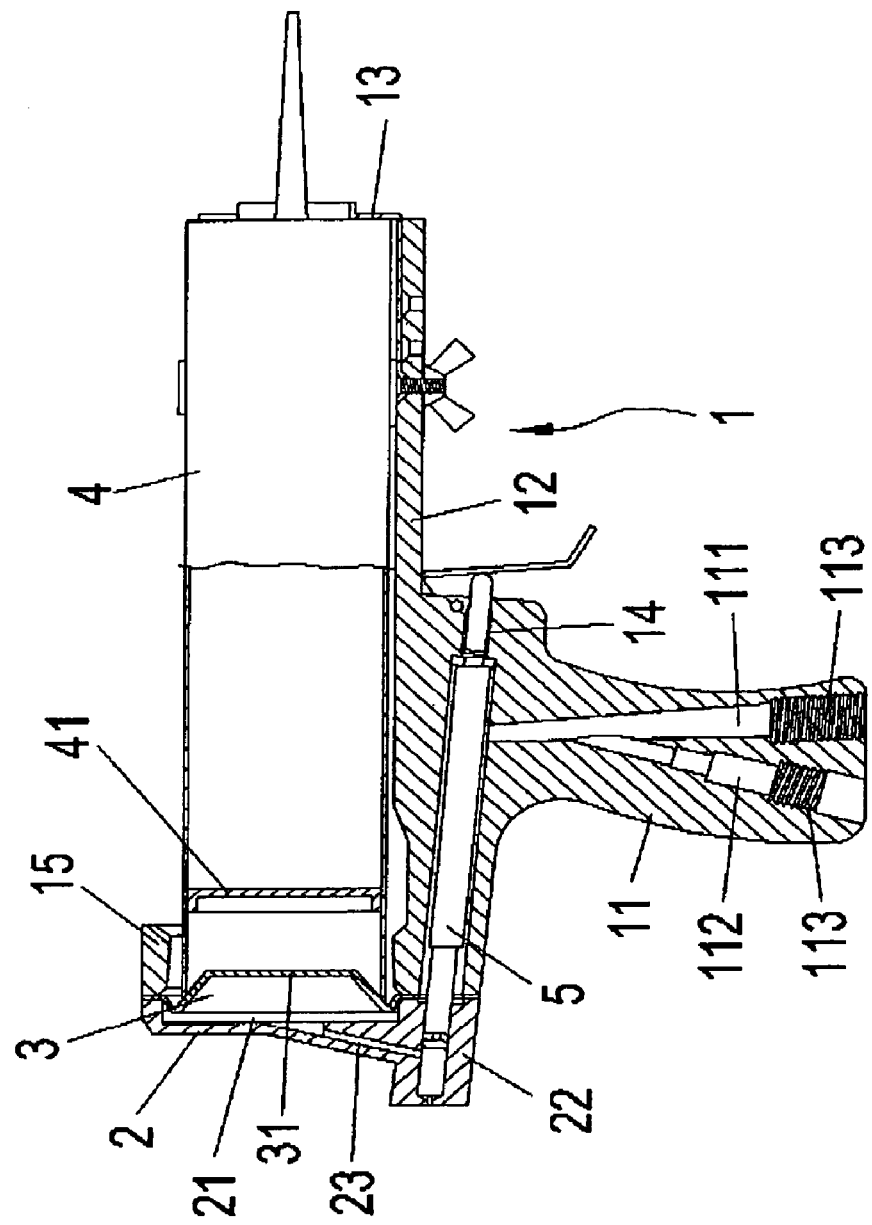
FIG. 1 schematically illustrates a conventional caulking gun.
Figure 2:
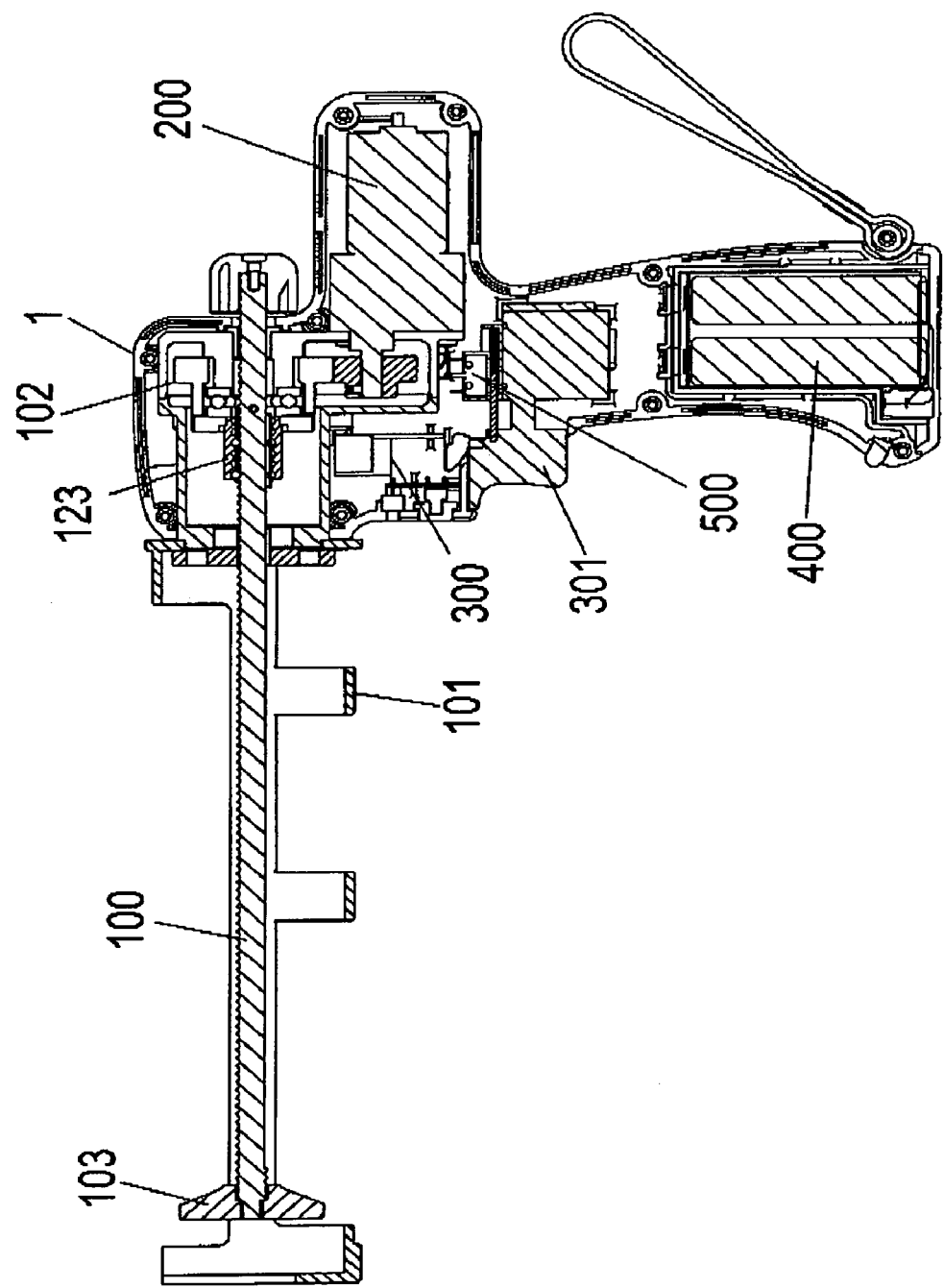
FIG. 2 schematically illustrates a structure of a preferred embodiment according to the present invention.

The above objects and advantages of the present invention will become more readily apparent to those ordinarily skilled in the art after reviewing the following detailed description and accompanying drawings.

Please refer to FIGS. 2, 3, 4, and 5. The device for dispensing viscid material according to the present invention includes a supporting body 1 constructed by a carriage 101. A ball screw 100 is installed within the supporting body 1. A rod piston 103 is mounted on one end of the ball screw 100. A transmission module 102 is mounted on a nut 123 of the ball screw 100. The transmission module 102 is engaged with an actuator 200 controlled by a control circuit device 300. The control circuit device 300, which includes a switch and a circuit board, etc, controls the positive and negative rotations and stop of the actuator 200. A plane 1210 or a fillister is formed on a shank of the ball screw 100. A corresponding plane or protruding object is disposed on the body 1 for limiting the shank to be rotated with the transmission module 102. A trigger 301 is set up on one side of the body 1. The trigger 301 connects to a trigger sensor 500 of the control circuit device 300 for controlling the operation of the actuator 200. When the trigger 301 is pressed, the actuator 200 is driven to rotate in the positive direction to drive the ball screw 100 moving forward stably. When the trigger 301 is released, the actuator 200 rotates in a negative direction to drive the ball screw 100 drawing back stably by means of the trigger sensor 500 or electric current checking circuit in the control circuit device 300. Furthermore, a normal battery 400 is optionally installed within the supporting body 1 to be a power source. Accordingly, this disclosed subject matter is convenient to be operated in a high place and therefore a user thereof can be protected form the danger of tripping over a power cord.

Figure 3:
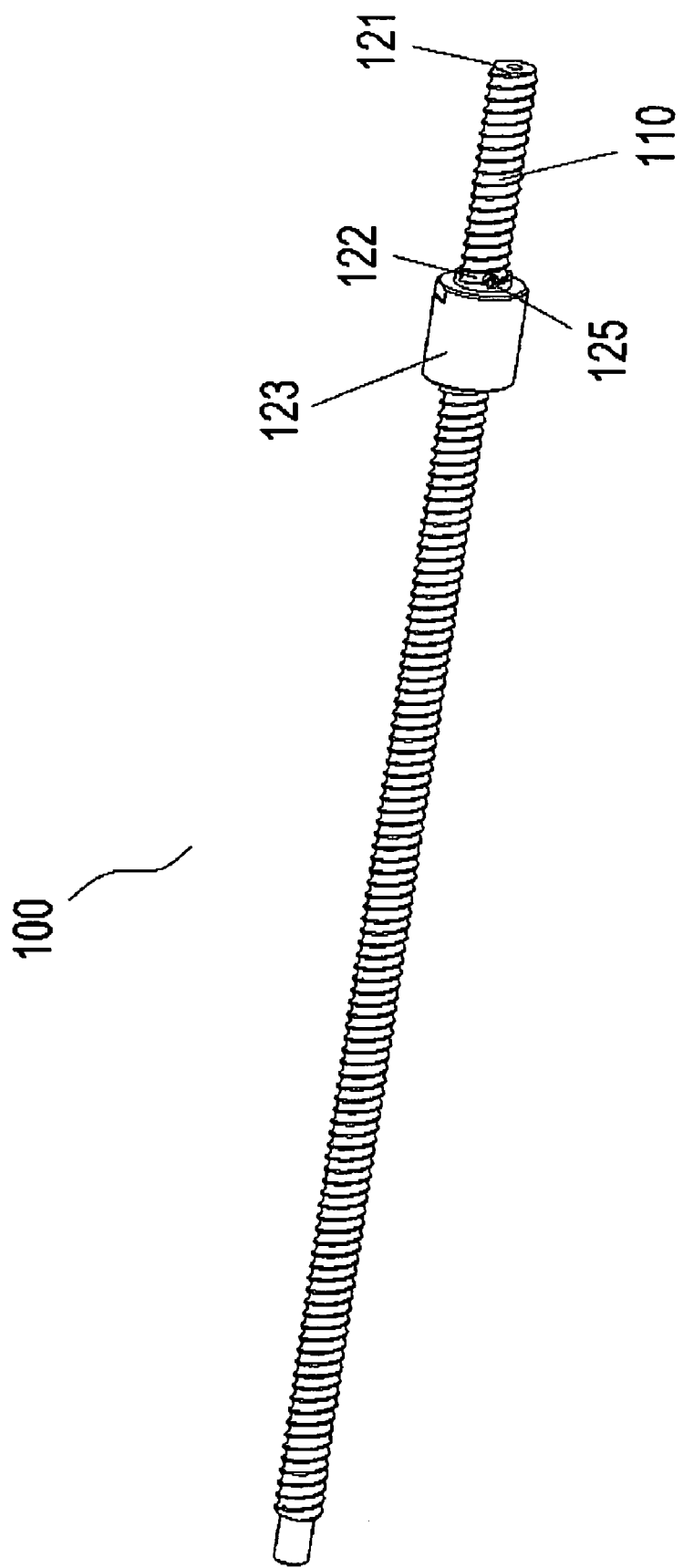
FIG. 3 is a perspective view schematically illustrating a ball screw of the preferred embodiment according to the present invention.
Figures 1, 3:
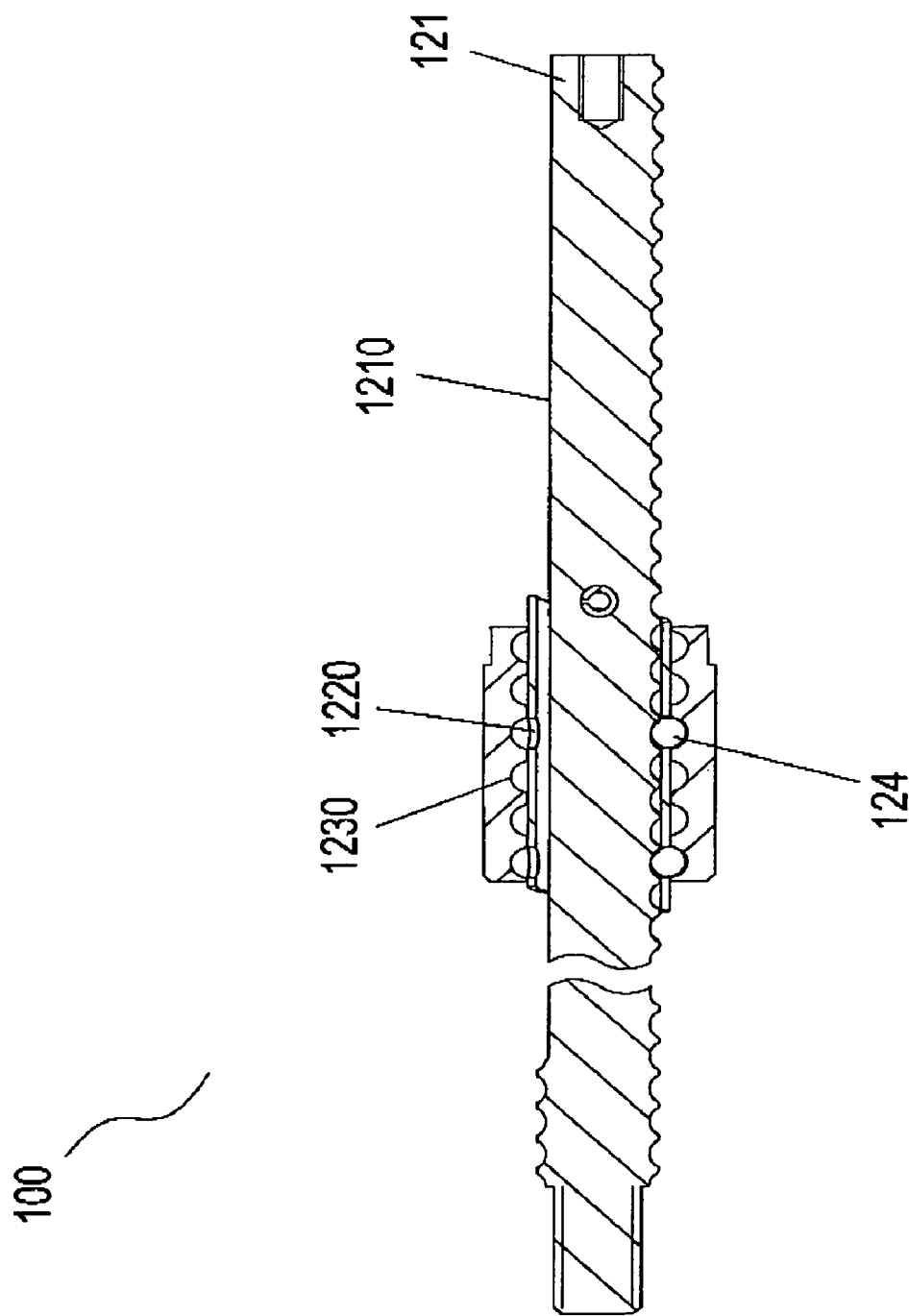

Please refer to FIGS. 3 and 3-1. The ball screw 100 of the present invention may be a safety ball screw 100. Such a safety ball screw 100 includes the shank 121, the nut 123, a shifting sleeve 122, and one or several balls 124. There is a limit position formed on the shank 121 which might be a protruding object 125. The ball 124 is embedded within an opening 1220 of the shifting sleeve 122. The opening 1220 might be circular or slot-shaped. The two ends of ball 124 respectively contact with the annular fillister 1230 formed on the nut 123 and a thread 110 on the shank 121. The annular fillister 1230 might be semicircle-shaped, V-shaped, or rectangular. When the shifting sleeve 122 contacts the limit position of the shank 121, the shifting sleeve 122 will no more rotate with the nut 123, and thus the shank 121 stops moving forward.

Figure 4:
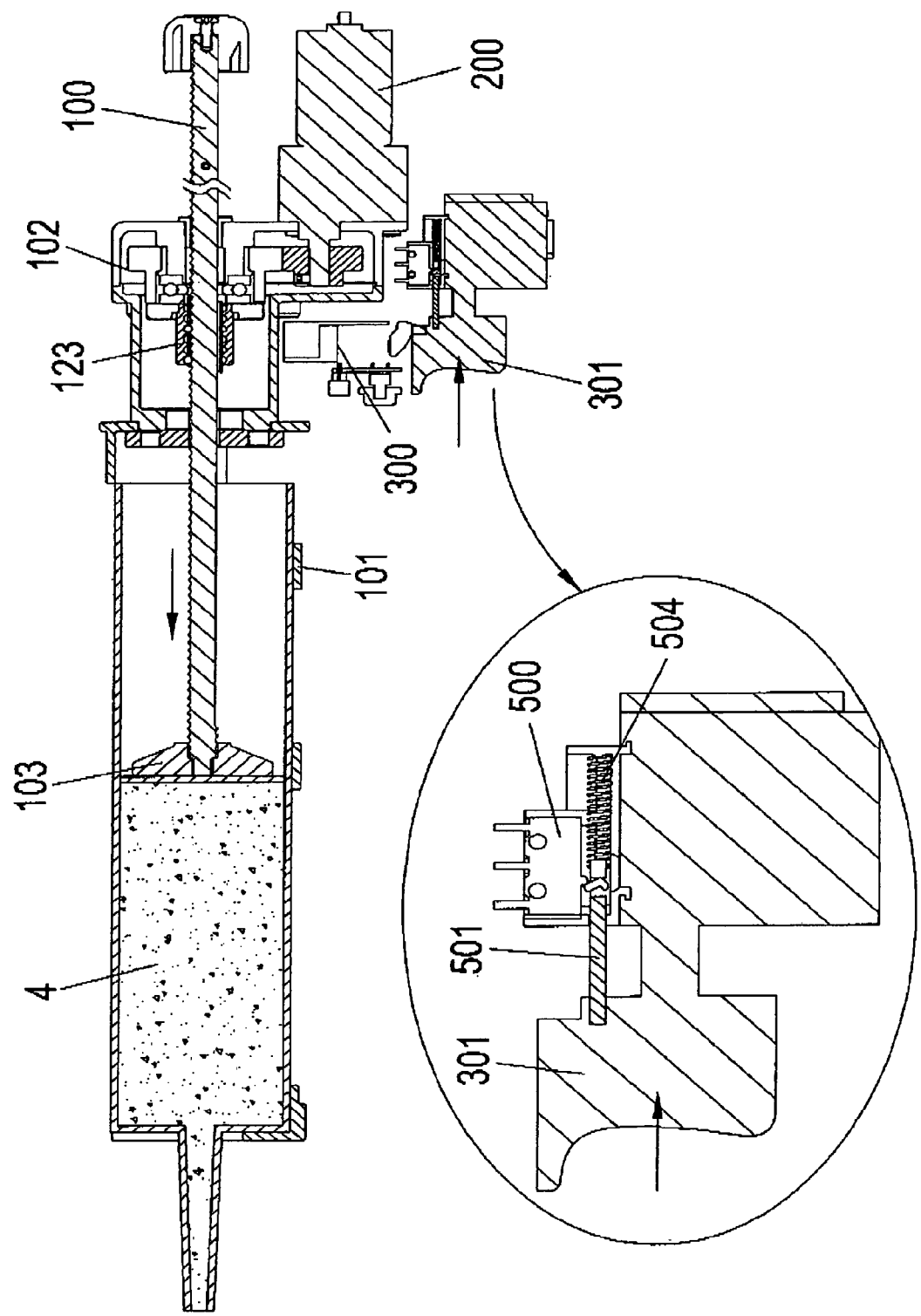
FIG. 4 is a cross-sectional view (I) schematically illustrating an operation of the preferred embodiment according to the present invention.
Figure 5:
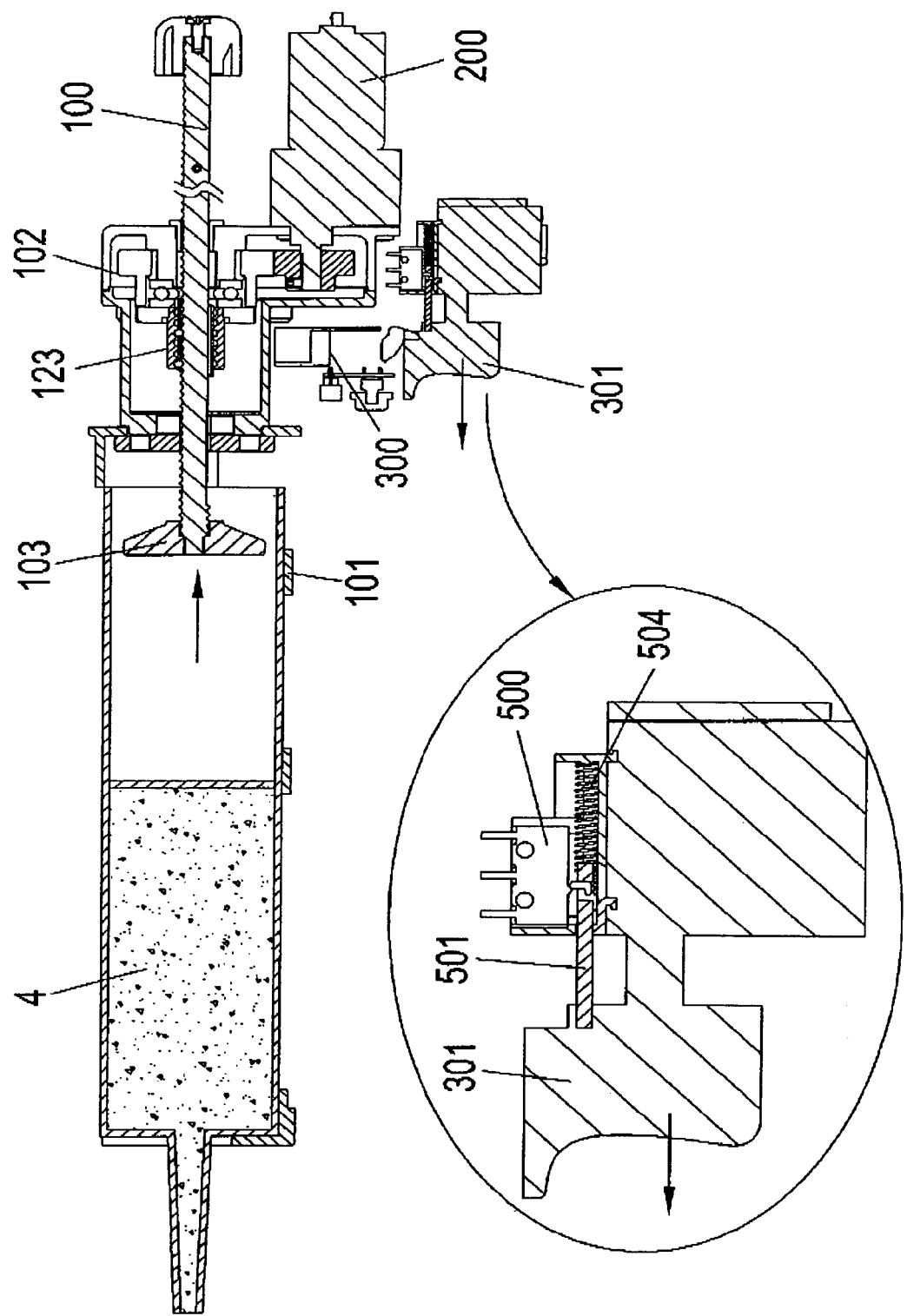
FIG. 5 is a cross-sectional view (II) schematically illustrating the operation of the preferred embodiment according to the present invention.
Figure 6:
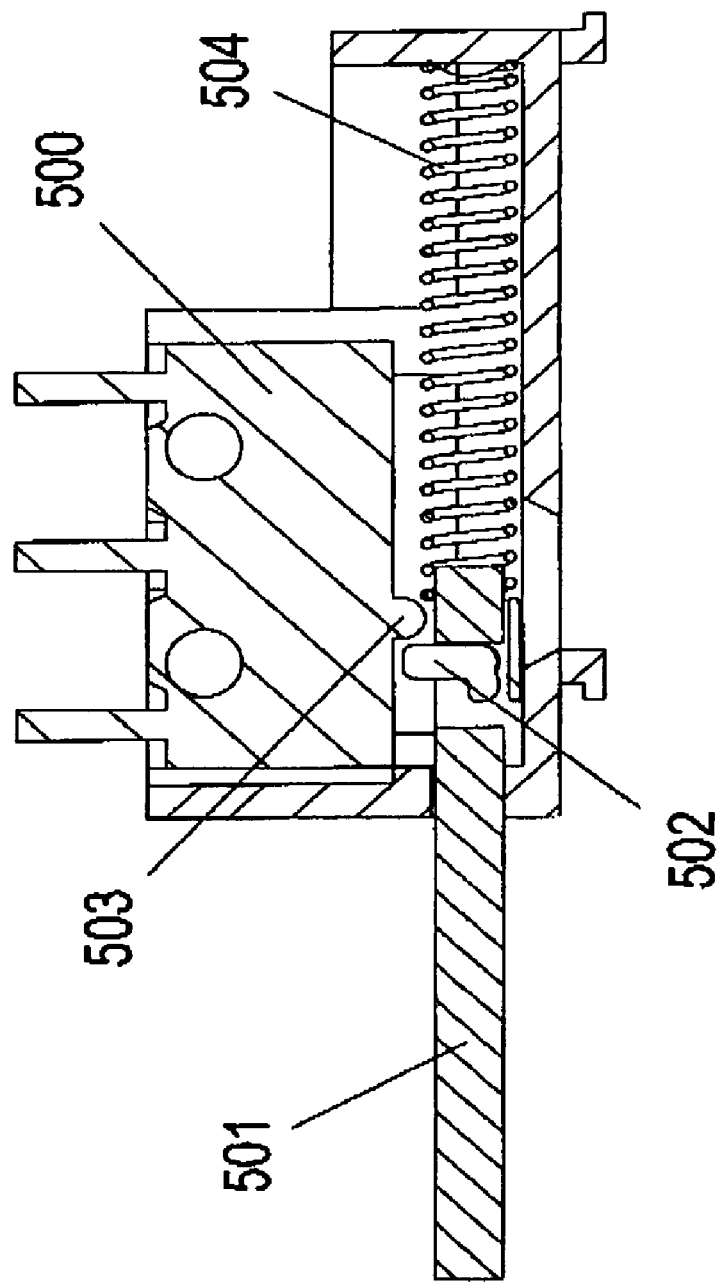
FIG. 6 is a cross sectional view schematically illustrating the structure of the trigger sensor of the preferred embodiment according to the present invention.

Please refer to FIGS. 4 and 5. The control circuit device 300 according to the present invention further includes the trigger sensor 500, which senses the position of the trigger for controlling the negative rotation of the actuator 200 to prevent the gel-drops. The trigger sensor 500 might be a one-way switch. When the trigger 301 is pressed, the actuator 200 rotates in the positive direction, and the ball screw 100 moves forwardly. On the other hand, when the trigger 301 is released to a certain position, the one-way switch is switched on, and thus the actuator 200 rotates in the negative direction.

Figure 7:
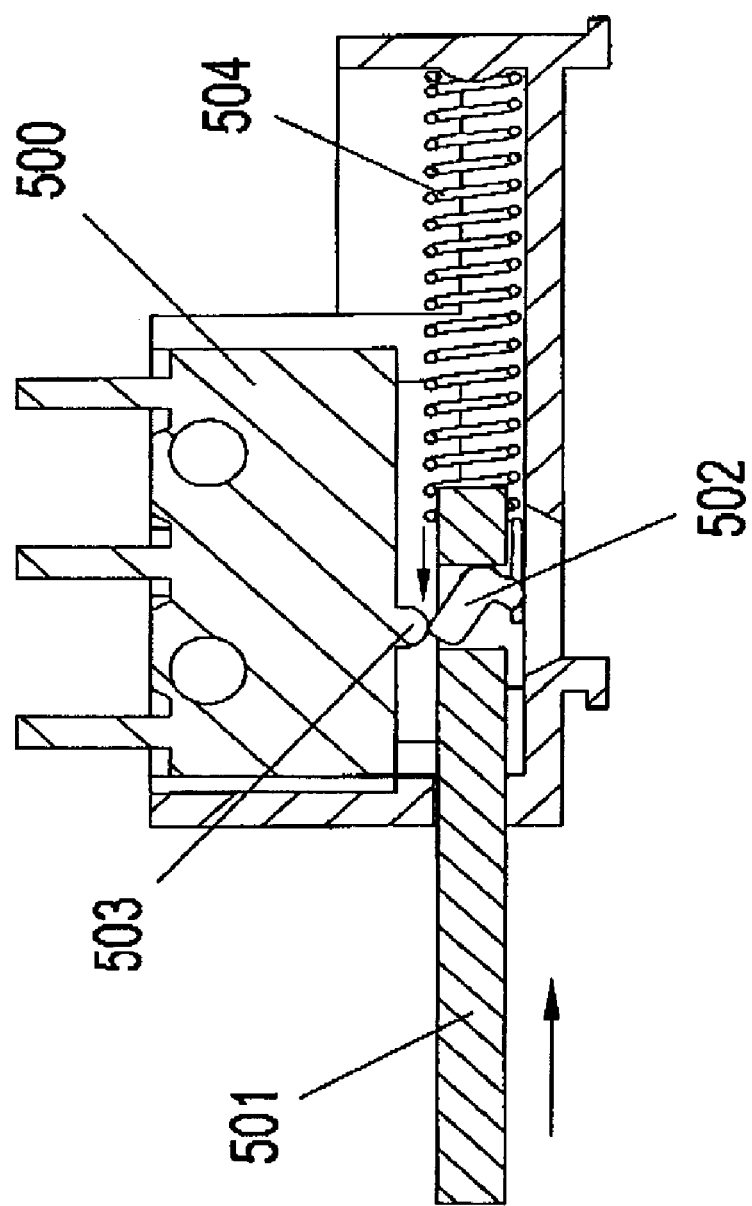
FIG. 7 is a cross sectional view (I) schematically illustrating the operation of the trigger sensor of a preferred embodiment according to the present invention.
Figure 8:
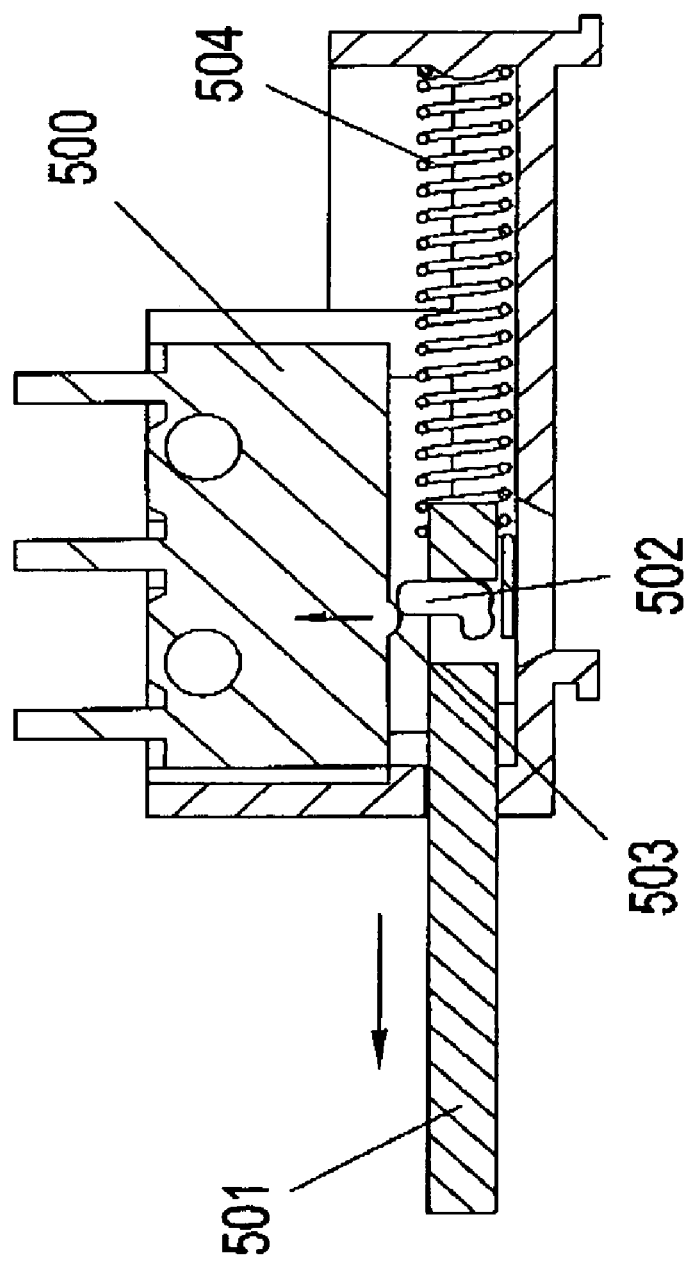
FIG. 8 is a cross sectional view (II) schematically illustrating the operation of the trigger sensor of the preferred embodiment according to the present invention.
Figure 9:
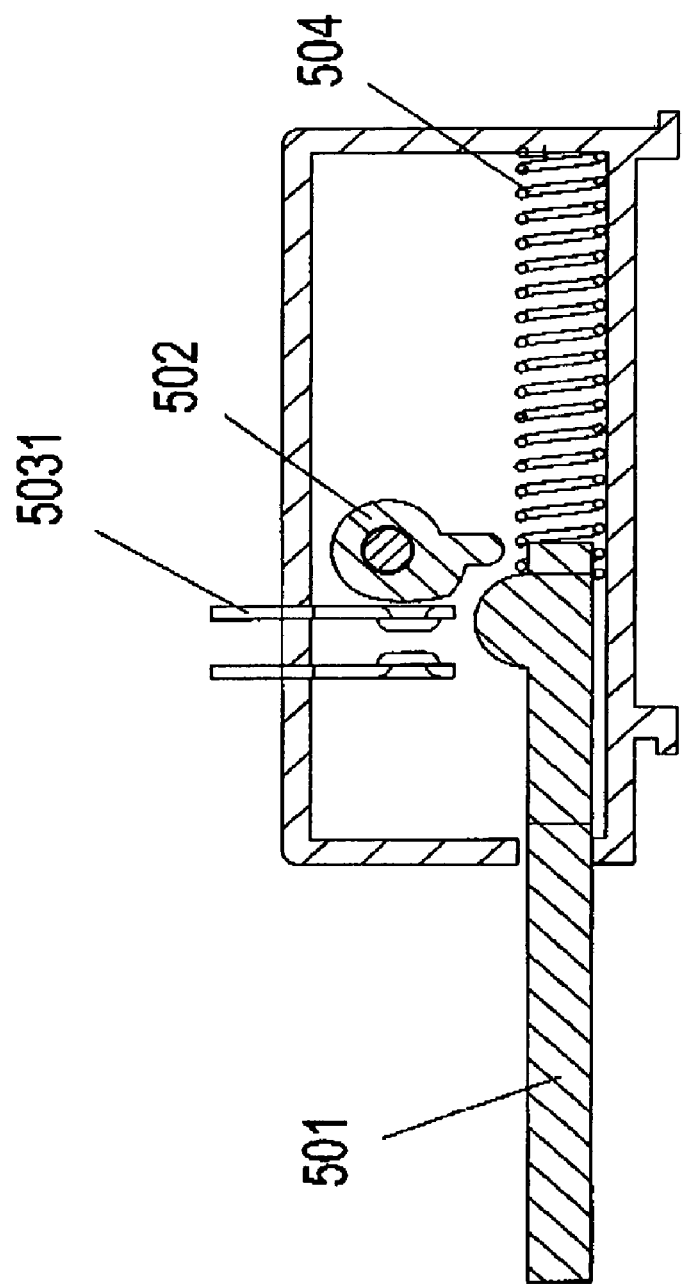
FIG. 9 is a cross sectional view schematically illustrating the structure of the trigger sensor of another preferred embodiment according to the present invention.

Please refer to FIGS. 6, 7, 8, and 9. The trigger sensor 500 might be a one-way switch. The trigger includes a press handle 501, an elastic element 504, an activating button 502, and a switch 503. The press handle 501 moves in combination with the trigger 301 and presses against an elastic element 504. The position of the activating button 502 is controlled by the press handle 501. As shown in FIG. 7, the activating button 502 will not activate the switch 503 while the trigger 301 is pressed. However, as shown in FIG. 8, when the trigger 301 goes back, (being released) the activating button 502 drives the switch 503 to activate the negative rotation of the actuator 200. Please refer to FIG. 9. The switch 503 might be a micro switch, a button switch, or a combination of two metal reeds 5031. The activating button 502 is a cam. When the press handle 501 activates the activating button 502, the activating button 502 rotates, and drive the switch to operate by means of the cam side.

Figure 10:
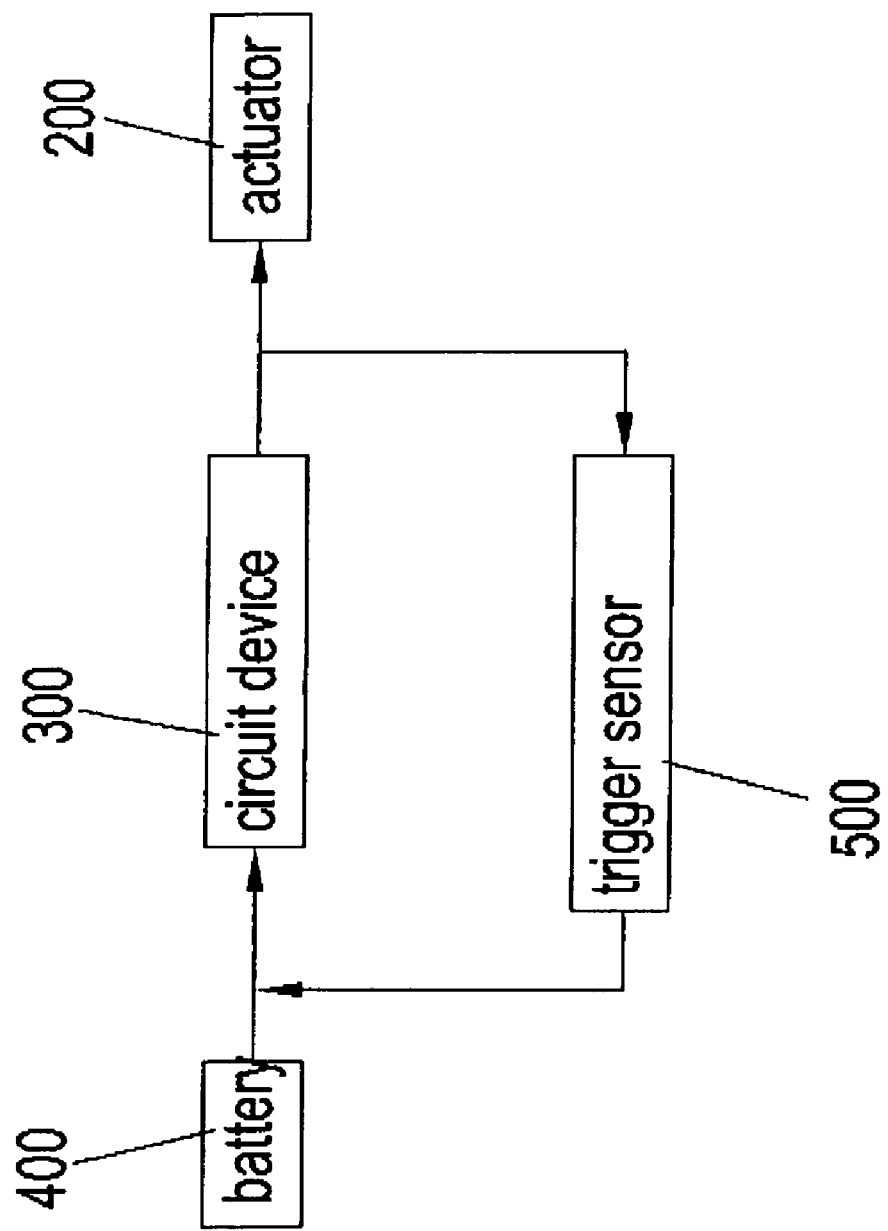
FIG. 10 is a circuit block diagram schematically illustrating a preferred embodiment according to the present invention.
Figure 11:
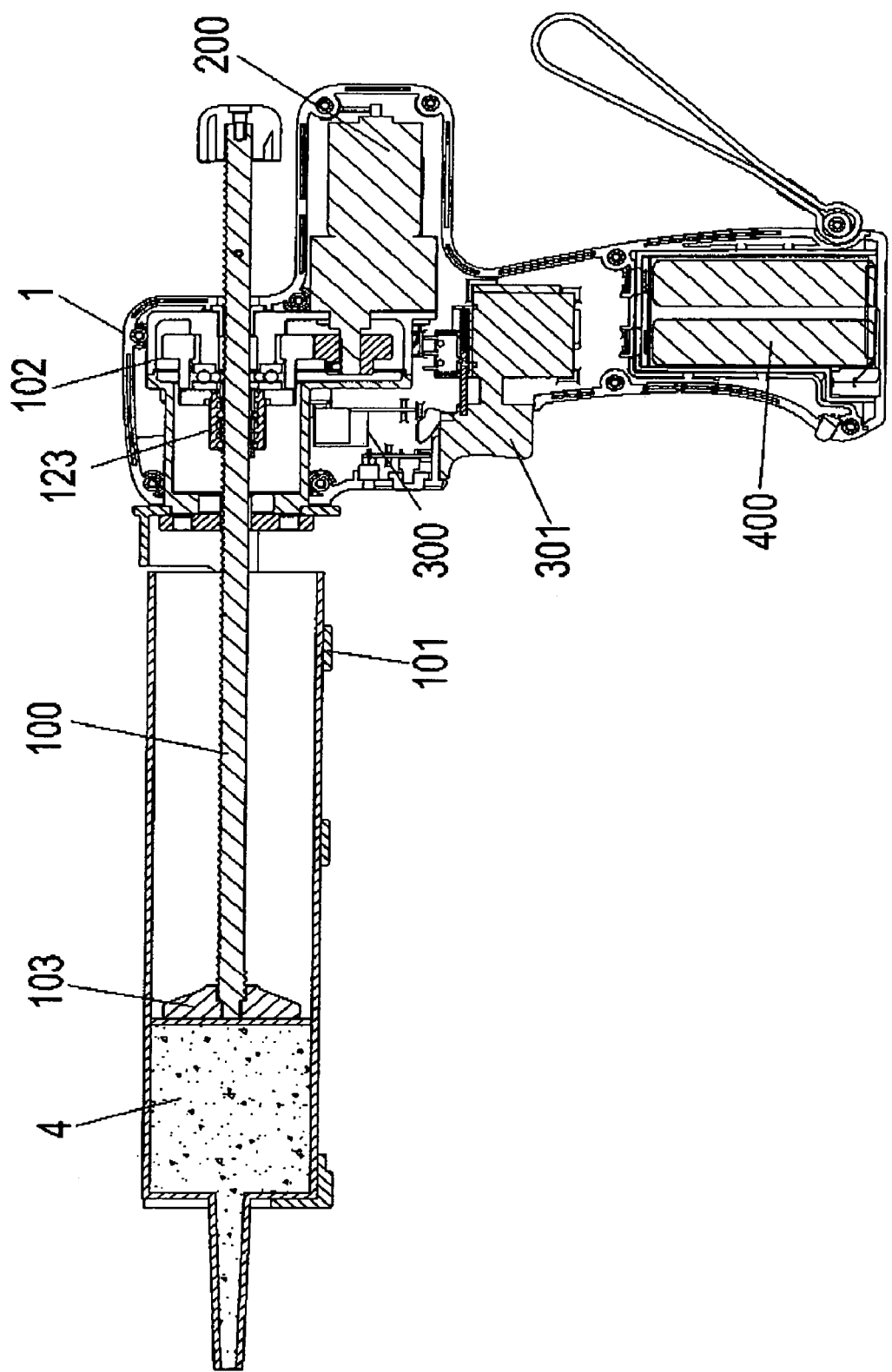
FIG. 11 is a cross sectional view schematically illustrating another preferred embodiment according to the present invention.

Please refer to FIGS. 10 and 11. According to the present invention, a silicon cartridge 4 is placed on a carriage 101 of the body 1. The colloid stored within the silicon cartridge 4 is squeezed by the rod piston 103 mounted on the front portion of the ball screw 100. The circuit structure is as shown in FIG. 10. When the trigger 301 is pressed, the control circuit device 300 drives the actuator 200 rotate in the positive direction to drive the ball screw 100 move forwardly in a stable way. While the trigger 301 is released, the activating button 502 activates the switch 503 to have the trigger sensor 500 connected to the control circuit device 300 to drive the actuator 200 rotate in the negative direction so that the ball screw 100 is driven to move backwardly in a stably way. Therefore, the leakage of silica gel is avoided, the silica gel flux is stable, the operation is effort-saving, and the cost is reduced.

Figure 12:
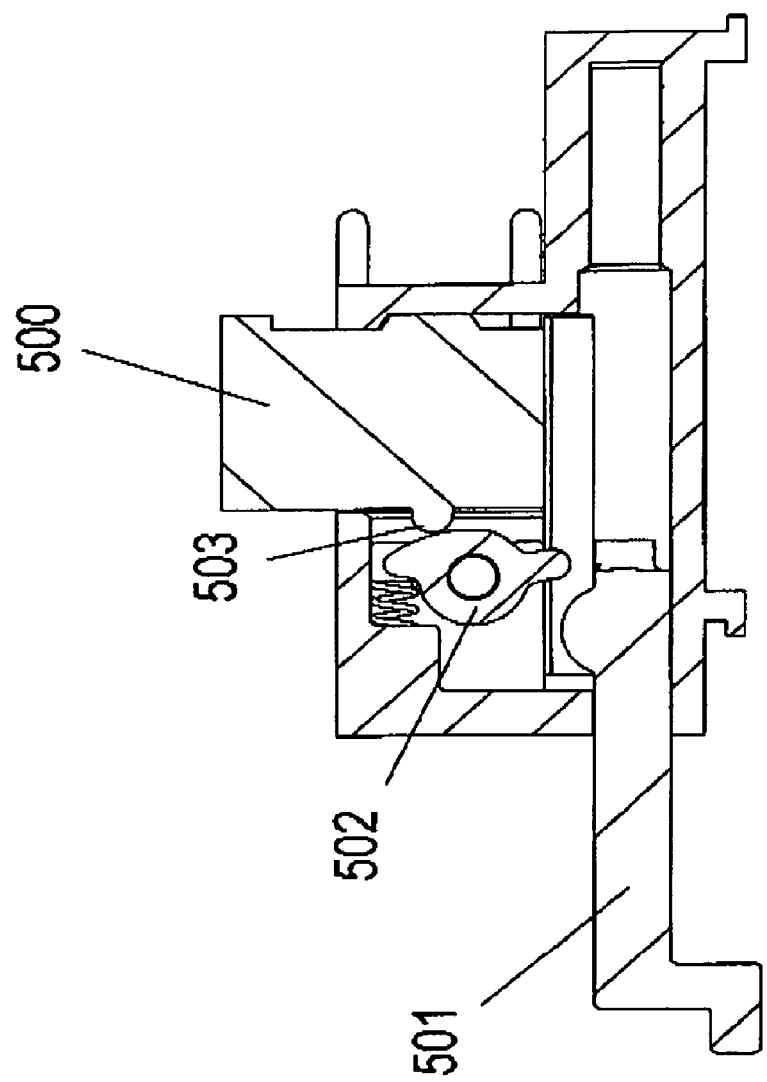
FIG. 12 is a cross sectional view schematically illustrating the structure of the trigger sensor of another preferred embodiment according to the present invention.

Please refer to FIG. 12. The trigger sensor 500 might be a one-way switch. The press handle 501 can be combined directly on the trigger 301. In such a case, the one-way switch only includes a press handle 501, an activating button 502, and a switch 503. When the press handle 501 drives the activating button 502, the activating button 502 spins and activates the switch 503 by using the elastic recovery force.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for dispensing a viscid material, comprising:
   a supporting body having therein a carriage, one side of which mounted thereon a trigger, wherein said trigger connects to a control circuit device for controlling an operation of an actuator;
   a ball screw, wherein a rod piston is mounted on one end of said ball screw,
   a transmission module mounted on a nut of said ball screw, wherein said transmission module is engaged with said actuator controlled by said control circuit device, and
   said control circuit device including a switch and a circuit hoard for controlling positive/negative rotation and stop of said actuator; and
   wherein said control circuit device further includes a trigger sensor for sensing a position of said trigger to control the negative rotation of said actuator to prevent gel-drops.

2. A device for dispensing a viscid material according to claim 1, wherein said trigger sensor is a one-way switch, and when said trigger is pressed, said actuator rotates in a positive direction to drive a shank of said ball screw moving forwardly, and when said trigger is released to a certain position, the one-way switch is switched on and having said actuator to rotate in the negative direction.

3. A device for dispensing a viscid material according to claim 2, wherein said one-way switch further includes a press handle, an elastic element, an activating button, and a switch, wherein said press handle moves in combination with said trigger and presses against said elastic element, and the position of said activating button is controlled by said press handle, wherein said switch will not be activated by said activating button when said trigger is pressed, and will be activated by said activating button when said trigger is hack (released) to activate the negative rotation of said actuator.

4. A device for dispensing a viscid material according to claim 3, wherein said press handle is combined directly on said trigger, and said one-way switch only includes a press handle, an activating button, and a switch.

5. A device for dispensing a viscid material according to claim 3, wherein said switch is a micro switch, a button switch, or a combination of two leaf springs.

6. A device for dispensing a viscid material according to claim 3, wherein said activating button is a cam, whereby when said press handle activates said activating button, said activating button rotates, and drives said switch to operate by means of a side where said cam forms.

7. A device for dispensing a viscid material according to claim 1, wherein said trigger sensor is a photo sensor, and a corresponding mark, is labeled on said trigger so that a forward/backward moving of said trigger can be detected by said photo sensor.

8. A device for dispensing a viscid material according to claim 1, wherein said control circuit device further includes an electric current checking circuit, and when a current on said control circuit device is converted from a positive value to zero, said actuator is activated to rotate in the negative direction for a period of time so as to prevent said gel-drops or release a dispensing pressure.

9. A device for dispensing a viscid material according to claim 1, wherein said control circuit device further includes an electric current checking circuit, and when a current of said device reaches a preset value, said actuator is activated to rotate in the negative direction for a period of time to release a dispensing pressure.

10. A device for dispensing a viscid material according to claim 1, wherein a plane or a fillister is formed on a shank of said ball screw, and a protruding object corresponding to said plane or said fillister is disposed on said body for limiting said shank to be rotated with said transmission module.

11. A device for dispensing a viscid material according to claim 1, wherein said ball screw is a safety ball screw, which includes a shank, the nut, a shifting sleeve, and one or several balls, wherein said ball is embedded within an opening of said shifting sleeve, and two ends of said opening respectively contact with an annular fillister formed on said nut and a thread on said shank, and when said shifting sleeve contacts a limit position of said shank, said shifting sleeve will no more rotate with said nut, and thus said shank stops moving forward.

12. A device for dispensing a viscid material according to claim 11, wherein a limit position formed on said shank of said safety ball screw is a protruding object selected from a pin, an annual buckle, and a bolt.

13. A device for dispensing a viscid material according to claim 11, wherein said opening on said shifting sleeve is circular or slot-shaped.

14. A device for dispensing a viscid material according to claim 11, wherein said annular fillister on said nut is semi-circle-shaped, V-shaped, or rectangular.

15. A device for dispensing a viscid material according to claim 1, wherein a normal battery is installed within said body for being a power source.

\* \* \* \* \*